United States Patent [19]

Wheeler et al.

[11] 4,153,597
[45] May 8, 1979

[54] HINDERED PHENOLIC NITRO COMPOUNDS AS ANTIOXIDANTS

[75] Inventors: Edward L. Wheeler, Watertown; Elmar H. Jancis, Naugatuck, both of Conn.

[73] Assignee: Uniroyal, Inc., New York, N.Y.

[21] Appl. No.: 919,011

[22] Filed: Jun. 26, 1978

[51] Int. Cl.$^2$ .................. C08K 5/32; C07C 79/18
[52] U.S. Cl. .................. 260/45.85 B; 252/51.5 R; 252/404; 560/75
[58] Field of Search .................. 260/45.85 B; 560/75; 252/404, 51.5 R

[56] References Cited

U.S. PATENT DOCUMENTS

| | | | |
|---|---|---|---|
| 3,285,855 | 11/1966 | Dexter et al. | 260/45.85 B |
| 3,414,538 | 12/1968 | Prinz et al. | 260/45.85 B |
| 3,867,467 | 2/1975 | Kline | 260/45.9 R |
| 3,962,313 | 6/1976 | Dexter et al. | 260/45.85 B |
| 4,007,159 | 2/1977 | Dourchis | 260/45.9 E |

*Primary Examiner*—V. P. Hoke
*Attorney, Agent, or Firm*—Anthony Lagani, Jr.

[57] ABSTRACT

A stabilizer suitable for use to protect organic materials into which it is soluble or miscible against oxidative degradation having the general formula

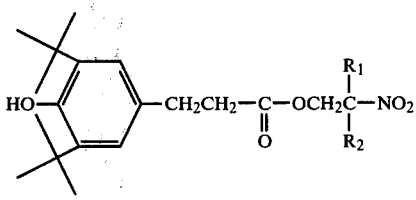

wherein $R_1$ and $R_2$ are lower alkyl or a radical of the structure

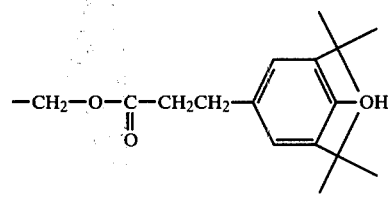

wherein "x" represents a tertiary butyl radical.

18 Claims, No Drawings

HINDERED PHENOLIC NITRO COMPOUNDS AS ANTIOXIDANTS

BACKGROUND OF THE INVENTION

It is well known in the art that the hindered phenols are useful as antioxidants and stabilizers. The compounds are used to stabilize both petroleum products and polymer compositions against oxidative degradation.

Nitro containing hindered phenols are known in the art; see for example U.S. Pat. No. 3,867,467 which discloses a compound of the general formula

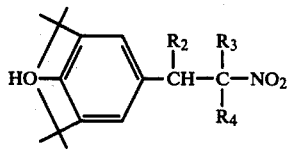

(I)

wherein "X" represents a tertiary butyl radical, $R_2$ and $R_3$ are hydrogen or alkyl and $R_4$ is an alkyl group. The reference also teaches the use of these compounds as antioxidants. U.S. Pat. No. 4,014,943 claims a compound having a structure

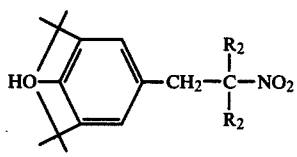

(II)

wherein $R_1$ and $R_2$ may be hydrogen, a lower alkyl or a radical of the structure

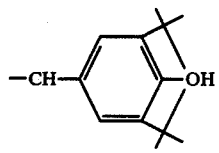

(III)

These compounds are taught as being antioxidants according to U.S. Pat. No. 4,007,159.

SUMMARY OF THE INVENTION

It has surprisingly been found that certain nitroalkane-based hindered phenols of the general formula

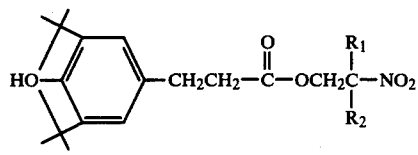

(IV)

where $R_1$ and $R_2$ are independently selected from the group consisting of lower alkyl and a radical of the structure

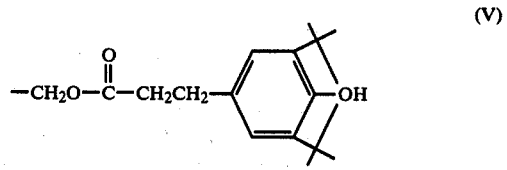

(V)

are exceptionally effective antioxidants in petroleum products and polymeric materials including synthetic and natural polymers.

DETAILED DESCRIPTION OF THE INVENTION

This invention relates to novel hindered phenolic compounds containing a nitro group. More particularly, the invention relates to compounds of the general structure

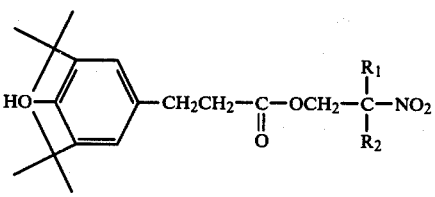

wherein $R_1$ and $R_2$ are independently selected from the group consisting of linear or branched alkyl radical having 1 to 6 carbon atoms and a radical of the structure

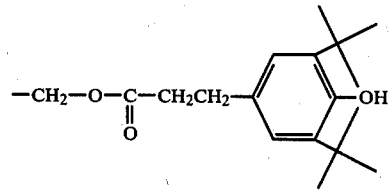

Preferably $R_1$ and $R_2$ are $C_1$–$C_4$ alkyl such as methyl, ethyl, propyl and butyl. Representative compounds of this invention are 2-methyl-2-nitrohexyl 3-(3,5-di-t-butyl-4-hydroxyphenyl)propionate; 2-ethyl-2-nitropentyl 3-(3,5-di-t-butyl-4-hydroxyphenyl)propionate; 2-propyl-2-nitropentyl 3-(3,5-di-t-butyl-4-hydroxyphenyl)propionate; 2-ethyl-2-nitro-trimethylenebis[3-(3,5-di-t-butyl-4-hydroxyphenyl)propionate]; and 2,2 disapropyl-2-nitroethyl 3-(3,5-di-t-butyl-4-hydroxyphenyl). Illustrative of the types of products which are subject to oxidative degradation and can be stabilized with the antioxidants of this invention include, petroleum products such as lubricating fluids, plastics, and synthetic and natural rubbers. Among the organic materials which can be stabilized against such degradation are polyolefins such as polyethylene, polypropylene, polybutylene, polyoctene, polybutadiene, polymethylpentene etc. Illustrative examples of other polymers and resins which may be stabilized by the hindered phenols of this invention are acetal resins, polyacrylates, polymethacrylates, polydialkylphthalates, cellulosics materials, polyamides, polyesters, polyurethanes, polycarbonates, polystyrene, polyvinyl chloride and polyvinylidene chloride. The known rubbery and resinous copolymers commercially available may also be stabilized using the antioxidants of this invention. Illustrative of these copolymers are poly(ethylene/propylene) (EPM), poly(butadiene/styrene), poly(ethylene/vinyl acetate), poly(ethylene/ethyl acrylate) as well as terpolymers such as poly (ethylene/propylene/non-conjugated diene) (EPDM) and acrylonitrile/butadiene/styrene) interpolymers.

Other organic compositions that can be stabilized by the compounds of this invention include hot melt adhesives such as those based on polyesters, polyamides or poly(ethylene/vinyl acetate). Additionally, petroleum products such as fuels, automotive lubricating fluids, petrolatum jellies, etc., as well as natural rubbers, waxes, fat, tallow, linseed oil, corn oil, cottonseed oil, codliver oil, tall oil fatty acid, etc. with or in which the compounds of this invention are miscible or soluble can also be stabilized.

The preceding list of compounds is merely illustrative and not intended to be exhaustive. The only requirement for utilization of the hindered phenols of this invention as a stabilizer for organic compounds, is that it be soluble or miscible with the organic compound. The amount of hindered phenols of this invention which must be incorporated into an organic compound in order to achieve protection against oxidation will depend on the nature of the compound and the intended service conditions. Generally, 0.001 to about 10 parts by weight of the compound of this invention per 100 parts be weight of organic compound is used; preferably about 0.05 to about 5 parts by weight per 100 parts of organic compound; more preferably about 0.1 to about 2.0 parts by weight of the compound of this invention is used per 100 parts by weight of the organic compound.

The hindered phenols of this invention may be used as the sole stabilizer or in combination with other known stabilizers. Illustrative examples of such other known stabilizers are dialkyl-thio-dipropionates such as dilauryl-thiodipropionate, dimyristyl thiodipropionate, distearyl thiodipropionate; phosphites such as tris-nonylphenyl phosphite, trilauryl phosphite, phenyl dilauryl phosphite, diphenyl lauryl phosphite, distearyl pentaerythritol diphosphite; benzophenone U.V. stabilizers such as 2-hydroxy-4-octyloxybenzophenone, , 2-hydroxy-4-dodecyloxybenzophenone, 2-hydroxy-4-methoxybenzophenone; benzotriazole U.V. stabilizers such as 2-(2'-hydroxy-5'-methylphenyl)benzotraizole, 2-(3',5'-di-tert-butyl-2'-hydroxyphenyl)benzotriazole, 2(3',5'-di-tert-amyl-2'-hydroxyphenyl)benzotriazole, 2-(2'-hydroxy-5'-tert-octylphenyl)benzotriazole, 2-(3',5'-di-tert-butyl-2'-hydroxyphenyl)-5-chlorobenzotriazole, 2-(3'-tert-butyl-2'-hydroxy-5'-methylphenyl)benzotriazole; various ester U.V. stabilizers such as dimethyl p-methoxybenzylidenemalonate, p-octylphenyl salicylate, phenyl salicylate, p-tert-butylphenyl salicylate, 2-ethylhexyl 2-cyano-3,3-diphenylacrylate, ethyl cyano-3,3-diphenylacrylate, resorcinol monobenzoate, 2,4-di-tert-butylphenyl 3,5-di-tert-butyl-4-hydroxybenzoate; nickel type U.V. stabilizers such as nickel bisoctylphenylsulfide,[2,2'-thiobis (4-tert-octylphenolates)]-n-butylamine nickel, nickel dibutyldithiocarbamate, copper chelators such as N,N',N",N"'-tetrasalicyldienetetra(aminomethyl)methane, diphenyloxamide, oxalylbis(benzylidenehydrazide) and N,N'-bis(3,5-di-tert-butyl-4-hydroxyphenyl)propionylhydrazine. The compounds of our invention can also be used together with carbon black, fillers, pigments and other compounding ingredients. Notwithstanding the similarities in the structure between the hindered phenols of this invention and the aforementioned prior art nitro containing hindered phenols the compounds of this invention provide stabilization superior to that of those prior art compounds. The advantages of the instant invention may be more readily appreciated by reference to the following examples.

EXAMPLE 1

A mixture of 72g (0.27 mole) 3-(3,5-di-tert-butyl-4-hydroxyphenyl) propionic acid and 25 ml (excess) thionyl chloride in 120 ml toluene was heated at reflux for 3 hours. The toluene and excess thionyl chloride is removed under vacuum in a rotary evaporator. The resulting acid chloride was dissolved in 100 ml toluene and was added to a mixture of 30g (0.25 mole) 2-nitro-2-methylpropanol and 50 ml pyridine in 80 ml toluene. The reaction mixture was stirred overnight at 50°-55° C. After cooling to room temperature, the reaction mixture was first washed with water, then with dilute hydrochloric acid and then again with water. After removal of the toluene a 99% yield of 2-methyl-2-nitropropyl 3-(3,5-di-tert-butyl-4-hydroxyphenyl) propionate was obtained. The infrared spectrum indicated the crude product to be essentially free of acid or acid chloride. After recrystallization from hexane, the product had a melting point range of 68°-70° C.

ANALYSIS: Calculated for $C_{21}H_{33}NO_5$ - 66.5%C; 8.8%H; 3.7%N. Found - 66.7%C; 8.6%H; 3.5%N.

EXAMPLE 2

By esterifying one mole of 2-methyl-2-nitropropanediol with two moles of 3-(3,5-di-tert-butyl-4-hydroxyphenyl) propionyl chloride in the manner described in Example 1, there was obtained 2-methyl-2-nitrotrimethylenebis[3-(3,5-di-tert-butyl-4-hydroxyphenyl)propionate]. M.P. 126°-129° C.

ANALYSIS: Calculated for $C_{38}H_{57}NO_2$ - 69.6%C; 8.7%H; 1.9%N. Found - 69.8%C; 8.8%H; 2.1%N.

EXAMPLE 3

By esterifying one mole of 2-ethyl-2-nitropropanediol with two moles of 2-(3,5-di-tert-butyl-4-hydroxyphenyl) propionyl chloride in the manner described in Example 1, there was obtained 2-ethyl-2-nitrotrimethylene bis[3-(3,5-di-tert-butyl-4-hydroxyphenyl)propionate].

The product obtained was an oil. The product was identified by its NMR Spectrum in carbon tetrachloride. The four phenyl protons appear as a singlet at 3.15τ, the two hydroxy protons appear as a singlet at 5.07τ, the four methylene protons next to the oxygen appear as a singlet at 5.67τ, the eight protons between the phenyl group and the carbonyl group appear as a multiplet centered around 7.32τ; the four tertiary butyl groups appear as a singlet at 8.64τ. The methyl of the ethyl group appears as a triplet centered around 9.23τ and the methylene of the ethyl appears as a quadruplet (somewhat obscured by the tertiary butyl group) centered around 8.7τ.

EXAMPLE 4

By esterifying one mole of tris(hydroxymethyl)nitromethane with three moles of 2-(3,5-di-tert-butyl-4-hydroxyphenyl) propionyl chloride in the manner described in Example 1, there was obtained 2-nitroisobutanetriyl tris[3-(3,5-di-tert-butyl-4-hydroxyphenyl) propionate]. M.P. 110°-112° C.

ANALYSIS: Calculated for $C_{55}H_{81}NO_{11}$ - 70.9%C; 8.8%H; 1.5%N. Found - 71.1%C; 8.9%H; 1.4%N.

EXAMPLE 5

The stabilizers of this invention and prior art nitro containing hindered phenols were compared by incorporating them into an unstabilized polypropylene resin (100 parts) having an initial melt flow index of 5 at 230° C. Blending was accomplished on a mill at 165° C., test samples were prepared of 1.9 mm-thick plaques by compression molding at 186 MPa and 177° C. These test specimens were then exposed in a test oven to forced air at 150° C., and the number of days to embrittlement was noted; Table 1 shows the results of these comparison studies.

TABLE 1

| Stabilizer | Parts by Weight | Days to failure |
| --- | --- | --- |
| None | — | 1 |
| Example 2 compound | 0.2 | 47 |
| Example 4 compound | 0.2 | 61 |
| Prior Art 1 | 0.2 | 7 |
| Prior Art 2 | 0.2 | 6 |
| Prior Art 1 - Tris(3,5-di-tert-butyl-4-hydroxybenzyl) nitromethane. | | |
| Prior Art 2 - 1,3-bis(3,5-di-tert-butyl-4-hydroxyphenyl)-2-nitropropane. | | |

It is noted that at the 0.2 parts by weight level, the stabilizers of this invention are far superior to the prior art chemicals as antioxidants.

EXAMPLE 6

The stabilizers of this invention demonstrate synergism when used together with certain co-stabilizers. The stabilizers were incorporated into 100 parts of polypropylene resin as described in Example 5. Oven aging was carried out at 150° C., and the number of days to embrittlement was noted. The results are shown in Table 2.

TABLE 2

| Stabilizer | Parts | Days to failure |
| --- | --- | --- |
| None | — | 1 |
| DSTDP* | 0.2 | 4 |
| Example 2 Product/DSTDP | 0.1/0.1 | 93 |
| Example 4 Product/DSTDP | 0.1/0.1 | 89 |
| Example 2 Product | 0.2 | 47 |
| Example 4 Product | 0.2 | 61 |

*Distearyl thiodipropionate

EXAMPLE 7

Various stabilizers were dissolved into a rubber cement containing about 110g of ethylene-propylene-ethylidenenorbornene terpolymer having an ethylene/propylene weight ratio of 53/47, an iodine number of 8 and a Mooney viscosity (ML-4) of 58 at 125° C., was dissolved in 2000g of hexane. Thereafter, 0.15 parts (per 100 parts of polymer, by weight) of the stabilizers listed below were added. The hexane was removed by slowly adding the cement to boiling water. The rubber blend was dried on a mill for 5 minutes at a temperature of 135°–150° C. Samples were tested by measuring the time in minutes to absorb 20 cc of oxygen at 150° C. The results are shown in Table 3.

TABLE 3

| Stabilizer | $T_{20}$ (minutes) |
| --- | --- |
| None | 27 |
| Example 1 Product | 480 |
| Example 3 Product | 535 |
| Example 4 Product | 420+ |
| Prior Art 3 | 315 |

Prior Art 3 = 2,6-di-tert-butyl-4-(2-nitro-1-propyl)phenol.

It is noted that the stabilizers of this invention show antioxidative properties unexpectedly superior to the prior art compound.

EXAMPLE 8

The compound of Example 4 (0.3 parts) was milled into a blend (100 parts) of EPDM (80 parts; E/P weight ratio = 53/47, iodine No. = 8, Mooney viscosity (ML-4) at 125° C. = 58) and polypropylene (20 parts; Melt Flow Index 13 at 230° C.). Plaques were compression molded having 1.9 mm thickness and test buttons punched therefrom. The latter were exposed to a temperature of 150° C. in an air flow oven, and the time to embrittlement of the buttons was noted. The results were as follows:

| Additive | Hours to Embrittlement |
| --- | --- |
| None | 80 |
| of Ex. 4 | 334 |

EXAMPLE 9

Into high impact polystyrene (100 parts; MFI = 2.1 at 200° C.) was milled the compound of Example 4 (0.25 parts) at 138° C. Notched Izod bars were molded at 77° C. and the impact strength was determined. After each measurement the samples were reground and remolded. The first and fifth test results were recorded.

| | Impact Strength* | | IS % |
| --- | --- | --- | --- |
| Additive | 1st | 5th | Retention |
| None | 4.72 J | 2.75 J | 58.3 |
| of Ex. 4 | 4.73 J | 3.93 J | 83.1 |

*ASTM D-256, Joules (N . m)

EXAMPLE 10

The chemical of Example 1 (1.0 part) was dissolved in 100 parts of mineral oil (spec. gravity 0.88–0.90 at 15.5° C.) and air was bubbled through the oil at a rate of 5 l/hr at 160° C. in the presence of a piece of copper/iron wire for 72 hours. The viscosity of the oil was measured initially and after 72 hours.

| | Viscosity* | | |
| --- | --- | --- | --- |
| Additive | Initial | At 72 hrs. | % Increase |
| None | 406 | 734 | 81 |
| of Ex. 1 | 406 | 458 | 13 |

*Saybold Universal Seconds (S.U.S.) at 38° C.

What is claimed is:

1. A compound of the formula

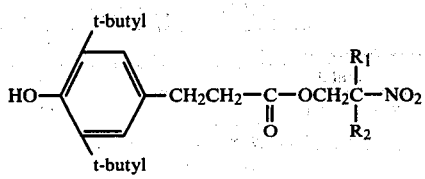

wherein $R_1$ and $R_2$ are each independently selected from the group consisting of linear or branched alkyl radicals having 1 to 6 carbon atoms and a radical of the structure

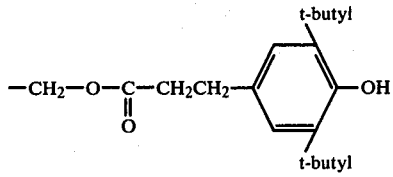

2. The compound according to claim 1 wherein $R_1$ and $R_2$ are methyl.

3. The compound according to claim 1 wherein $R_1$ is methyl and $R_2$ is a radical of the structure

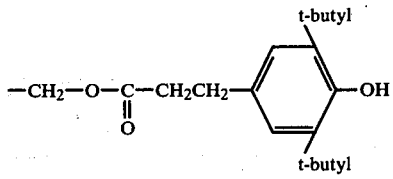

4. The compound according to claim 1 wherein $R_1$ is ethyl and $R_2$ is a radical of the structure

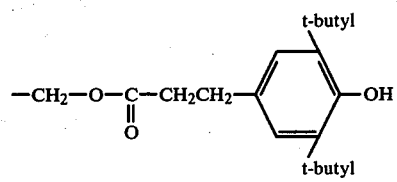

5. The compound according to claim 1 wherein $R_1$ and $R_2$ are each radicals of the structure

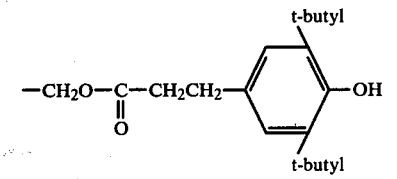

6. A composition comprising an organic material normally subject to oxidative deterioration and a stabilizing amount of a compound having the general formula

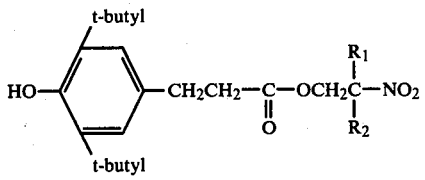

wherein $R_1$ and $R_2$ are each independently selected from the group consisting of linear or branched lower alkyls radicals having 1 to 6 carbon atoms and a radical of the structure 7. The composition according to claim 6 where the said organic material is a polyolefin.

8. The composition according to claim 7 where the polyolefin is polypropylene.

9. The composition according to claim 6 where the organic material is an ethylene-propylene-non-conjugated diene terpolymer, polyethylene, or polystyrene.

10. A composition according to claim 9 where said non-conjugated diene is dicyclopentadiene or ethylidene norbornene.

11. The composition of claim 6 wherein the said organic material is a mixture of polypropylene and an ethylene-propylene-non-conjugated diene terpolymer.

12. The composition according to claim 6 wherein said organic material is a polyolefin and the stabilizer is a compound having the formula

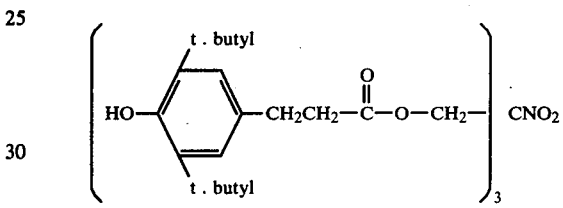

13. A composition of matter according to claims 6 or 12 wherein a dialkyl thiodipropionate is used as a co-stabilizer.

14. A stabilizer composition comprising (1) a compound of the general formula

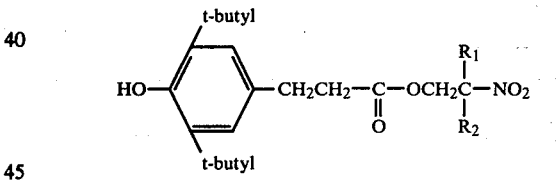

wherein $R_1$ and $R_2$ are each independently selected from the group consisting of linear or branched alkyl radicals having 1 to 6 carbon atoms and a radical of the structure

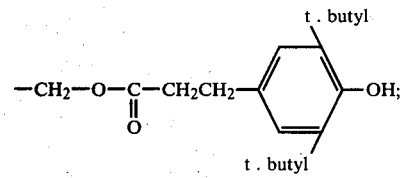

and (2) a dialkyl thiodipropionate.

15. The composition of claim 14 wherein the compound and the dialkyl thiodipropionate are present in stabilizing amounts.

16. The compound of claim 1 wherein $R_1$ and $R_2$ are $C_1$–$C_4$ alkyl.

17. The composition according to claim 6 wherein $R_1$ and $R_2$ are $C_1$–$C_4$ alkyl.

18. The composition of claim 14 wherein $R_1$ and $R_2$ are $C_1$–$C_4$ alkyl.

* * * * *